(12) United States Patent
Arnold

(10) Patent No.: US 7,836,694 B2
(45) Date of Patent: Nov. 23, 2010

(54) AIR BEARING TURBO COOLING AIR FLOW REGULATING DEVICE

(75) Inventor: Steven Don Arnold, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 762 days.

(21) Appl. No.: 11/777,959

(22) Filed: Jul. 13, 2007

(65) Prior Publication Data
US 2009/0324381 A1 Dec. 31, 2009

Related U.S. Application Data

(63) Continuation-in-part of application No. 11/124,301, filed on May 6, 2005, now abandoned.

(51) Int. Cl.
| | |
|---|---|
| F02B 33/44 | (2006.01) |
| F02B 39/00 | (2006.01) |
| F16K 15/00 | (2006.01) |
| F16K 17/00 | (2006.01) |
| F16K 21/04 | (2006.01) |
| F16K 31/12 | (2006.01) |
| F16K 31/00 | (2006.01) |
| F04B 17/00 | (2006.01) |

(52) U.S. Cl. ............... 60/605.3; 60/605.1; 137/528; 137/625.5; 251/31; 251/63; 251/63.5; 251/63.6; 251/33; 417/407; 417/366

(58) Field of Classification Search ............. 60/605.3, 60/605.1; 137/528, 625.5, 494, 62, 556.3, 137/246.19; 251/31, 33, 35, 63, 63.5–63.6; 417/407, 366
See application file for complete search history.

(56) References Cited

U.S. PATENT DOCUMENTS 2,973,136 A 2/1961 Greenwald ............... 417/407

(Continued)

FOREIGN PATENT DOCUMENTS

| JP | 07208189 A | 8/1995 |
|---|---|---|
| WO | WO 0204827 A1 * | 1/2002 |

OTHER PUBLICATIONS

James F. Walton II, Oil-Free Turbocharger Demonstration Paves Way to Gas Turbine Engine Applications, Paper 2000-GT-0620, Germany, May 8-11, 2000.*

Primary Examiner—Thai Ba Trieu
(74) Attorney, Agent, or Firm—Oral Caglar, Esq.

(57) ABSTRACT

A cooling air flow regulating device for controlling the flow of cooling air to an air bearing may comprise a housing with a piston and a spring disposed within. When the pressure of the cooling air is high, the piston is forced out of the path of the cooling air and into an open position. As the pressure of the cooling air decreases, the spring forces the piston back into the path of the cooling air, effectively blocking the flow of cooling air to the air bearing. The cooling air flow regulating device of the present invention may be useful for controlling the cooling of air bearings in turbochargers of turbocharged engine, where at low engine speed, cooling air is not required for air bearings. Methods for using the cooling air flow regulating device of the present invention are also provided.

20 Claims, 6 Drawing Sheets

U.S. PATENT DOCUMENTS

| | | | | |
|---|---|---|---|---|
| 3,010,691 A | * | 11/1961 | Canfield | 251/30.02 |
| 3,133,425 A | | 5/1964 | Hanny et al. | 62/172 |
| 3,192,942 A | | 7/1965 | Manor et al. | 137/246.19 |
| 3,259,358 A | * | 7/1966 | Tripoli | 251/214 |
| 3,280,843 A | * | 10/1966 | Rutherford | 251/31 |
| 3,379,405 A | * | 4/1968 | Natho | 251/63.6 |
| 3,428,242 A | | 2/1969 | Rannenberg | 415/180 |
| 3,905,576 A | * | 9/1975 | Fox, Jr. | 251/327 |
| 4,132,237 A | * | 1/1979 | Kennedy et al. | 137/75 |
| 4,156,342 A | | 5/1979 | Korta et al. | |
| 4,201,362 A | * | 5/1980 | Nishimi et al. | 251/30.05 |
| 4,356,833 A | | 11/1982 | Mayfield et al. | 137/62 |
| 4,463,930 A | * | 8/1984 | Vamvakas | 251/129.12 |
| 4,508,132 A | | 4/1985 | Mayfield et al. | 137/62 |
| 4,585,207 A | * | 4/1986 | Shelton | 251/63 |
| 4,643,390 A | * | 2/1987 | Karr et al. | 251/63.6 |
| 4,911,401 A | * | 3/1990 | Holcomb et al. | 251/30.03 |
| 5,095,950 A | * | 3/1992 | Hallberg | 137/625.17 |
| 5,288,052 A | | 2/1994 | Black et al. | 251/30.01 |
| 5,632,466 A | | 5/1997 | Ochs | 251/63.5 |
| 5,820,106 A | * | 10/1998 | Wurangian | 251/326 |
| 6,102,672 A | | 8/2000 | Woollenweber et al. | 417/36 |
| 6,415,815 B1 | | 7/2002 | Blann et al. | 137/494 |
| 6,457,311 B2 | | 10/2002 | Fledersbacher et al. | 60/605.3 |
| 6,668,553 B1 | | 12/2003 | Ghizawi | 60/605.3 |
| 6,684,897 B2 | * | 2/2004 | Sundararajan | 251/63 |
| 6,767,182 B2 | | 7/2004 | Coppola | 415/115 |
| 2002/0056819 A1 | | 5/2002 | Contin et al. | 251/63 |
| 2004/0141836 A1 | | 7/2004 | McAuliffe et al. | 415/145 |
| 2005/0193732 A1 | | 9/2005 | LaRue | 60/605.1 |
| 2005/0210875 A1 | | 9/2005 | Larue et al. | 60/602 |
| 2006/0042246 A1 | * | 3/2006 | Gray et al. | 60/612 |

* cited by examiner

AIR BEARING TURBO COOLING AIR FLOW REGULATING DEVICE

CROSS-REFERENCE TO RELATED APPLICATIONS

The present application is a continuation-in-part of application Ser. No. 11/124,301, filed May 6, 2005, now abandoned.

BACKGROUND OF THE INVENTION

The present invention relates generally to air bearings and more specifically to devices for shutting off cooling air for air bearings. Air bearings, being more efficient than hydrodynamic bearings, should improve transient response and low speed boost capability of an engine. However, air bearings require cooling air, which is taken from the boost compressor air after the charge air cooler. Therefore, the system efficiency is about the same for air bearings as for hydrodynamic bearings, negating the advantage of the air bearings.

To date, it has not been possible to eliminate the cooling air for the air bearings due to the heat generation at high speeds and the heat flux into the center housing from both the compressor and turbine. However, at low turbo speeds there is not an essential need for the cooling air as the heat generation of the air bearings is low as are the temperatures of the turbine and compressor. An improvement to the turbo system efficiency may be achieved by eliminating the cooling air at low turbo speeds.

U.S. Pat. No. 4,156,342 describes a method of cooling a bearing in a turbine engine where air is bled from an intermediate stage of the compressor turbine and fed, through piping, to the bearing housing. However, the '342 patent does not provide for any means to control the flow of cooling air, especially at low speeds.

U.S. Patent Application Publication 2004/0141836 describes a compressor assembly in which cooling air is diverted from the compressor inlet for cooling an air bearing. A valve controls the flow of air through the air flow path, allowing the flow of cooling air to be shut off when the compressor assembly is not operating. The system does not allow for controlling the flow of cooling air at low speed operation. Moreover, the valve operates via a three force balance, where the outlet pressure from the combustor is fed into a separate chamber and controls the opening and closing of the valve.

As can be seen, there is a need for a device to control the flow of cooling air to an air bearing in a compressor assembly of a turbocharger, particularly a device to shutoff air flow under low speed conditions.

SUMMARY OF THE INVENTION

In one aspect of the present invention there is provided a cooling air flow regulating device comprising a housing, wherein the housing comprises an air inlet and an air outlet, wherein the air inlet and air outlet form a cooling air passage; a piston, the piston being disposed in the housing and wherein the piston is movable between a first position blocking the cooling air passage and a second position outside of the cooling air passage; and an actuating device, the actuating device being capable of moving the piston between the first position and the second position, wherein the actuating device is responsive to an air pressure in the cooling air passage.

In another aspect of the present invention there is provided a cooling air flow regulating device comprising a housing, wherein the housing comprises a vent, an air inlet and an air outlet, wherein the air inlet and air outlet form a cooling air passage; a piston, the piston being disposed between the cooling air passage and the vent; a seal, the seal disposed between the cooling air passage and the vent; a spring, the spring being disposed between the piston and the vent in the casing; and wherein the cooling air flow regulating device has an open position and a closed position.

In a further aspect of the present invention there is provided a cooling air flow regulating device comprising a housing, wherein the housing comprises a vent, an air inlet and an air outlet, wherein the air inlet and air outlet form a cooling air passage; a piston, the piston being disposed between the cooling air passage and the vent, wherein the piston can move between the vent and the air cooling passage; a diaphragm, the diaphragm being disposed between the cooling air passage and the vent; a spring, the spring being disposed between the piston and the vent in the casing; and wherein the cooling air flow regulating device has an open position and a closed position, the open position comprising the piston disposed toward the vent and the closed position comprising the piston disposed in between the air inlet and the air outlet.

In yet another aspect of the present invention there is provided a turbocharger comprising a turbine; a boost compressor; a shaft, the shaft connecting the turbine and the boost compressor; an air bearing, the air bearing contacting the shaft; a cooling air flow regulating device, the cooling air flow regulating device being in fluid communication with the air bearing and wherein the cooling air flow regulating device comprises a housing, wherein the housing comprises an air inlet and an air outlet, wherein the air inlet and air outlet form a cooling air passage, a piston, the piston being disposed in the housing, wherein the piston is movable between a first position blocking the cooling air passage and a second position outside of the cooling air passage and an actuating device, the actuating device being capable of moving the piston between the first position and the second position, wherein the actuating device is responsive to an air pressure in the cooling air passage.

In another aspect of the present invention there is provided a turbocharged engine comprising an engine; a turbocharger, the turbocharger in fluid communication with the engine, wherein the turbocharger comprises an air bearing and a cooling air flow regulating device, wherein the cooling air flow regulating device is in fluid communication with the air bearing; an air charge cooler, the air charge cooler being in fluid communication with the cooling air flow regulating device; and wherein the cooling air flow regulating device comprises a housing, the housing comprising a vent, an air inlet and an air outlet, wherein the air inlet and air outlet form a cooling air passage, a piston, the piston being disposed between the cooling air passage and the vent, a seal, the seal disposed between the cooling air passage and the vent, a spring, the spring being disposed between the piston and the vent in the casing, and wherein the cooling air flow regulating device has an open position and a closed position.

In a further aspect of the present invention there is provided a method of cooling an air bearing comprising the steps of providing air bearing cooling air, the bearing cooling air comprising a pressure $P_1$; flowing the cooling air through a cooling air passage into a cooling air flow regulating device, the cooling air flow regulating device comprising a piston and wherein the piston is in a closed position, blocking the flow of cooling air through the cooling air flow regulating device; increasing the pressure of the cooling air to $P_2$, forcing the piston to move away from the cooling air passage by the increased pressure $P_2$, allowing the cooling air to flow through the cooling air flow regulating device to the air bearing; and cooling the air bearing.

In yet another aspect of the present invention there is provided a method for shutting off the flow of cooling air to an air bearing comprising the steps of flowing air bearing cooling air having a pressure $P_2$ through a cooling air passage and a cooling air flow regulating device to the air bearing, the cooling air flow regulating device being disposed in the cooling air passage and wherein the cooling air flow regulating device comprises a piston; decreasing the cooling air pressure to a pressure $P_1$; and moving the piston to block the cooling air passage, wherein no cooling air flows through the cooling air flow regulating device.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a cooling air flow regulating device for controlling cooling air for air bearings in a compressor assembly or a turbocharger. Methods for using the cooling air flow regulating device of the present invention are also provided. The flow regulating device may comprise a piston positioned in a housing. The housing may comprise an air inlet, an air outlet a vent and a spring. The piston may be held in position by the spring such that it blocks the air inlet and outlet at low turbo speeds. At high turbo speeds, cooling air from a compressor or charge air cooler may pass into the air inlet and provides sufficient pressure to push the piston against the spring, opening a passage for the cool air to pass through the air outlet and flow to the air bearings. As the turbo speed decreases, at some set speed the pressure of the cooling air may be insufficient to push the piston into the open position and the piston may return to the closed position, blocking the cooling air from passing through to the air bearings. The cooling air flow regulating device of the present invention may be used in, but not limited to, turbocharged engines of land vehicles and aircraft, air cycle machines, electric driven turbocompressors and fuel cell pressurization.

At low turbo speeds, cooling air is not required for air bearings. However, most turbochargers and compressor assemblies do not have a means for controlling cooling air flow and therefore it continues to flow, even at low turbo speeds, negating any efficiency gained by having air bearings over hydrodynamic bearings. The cooling air flow control devices that are known in the art shutoff the flow of cooling air when the engine or turbocharger shuts down, but not at low speed. In contrast, the cooling air flow regulating device of the present invention may shutoff the flow of cooling air at low engine speeds. Moreover, because the present invention shuts off the flow of cooling air at low engine speeds, turbo lag may be reduced or eliminated when the engine is started.

Figure 1:
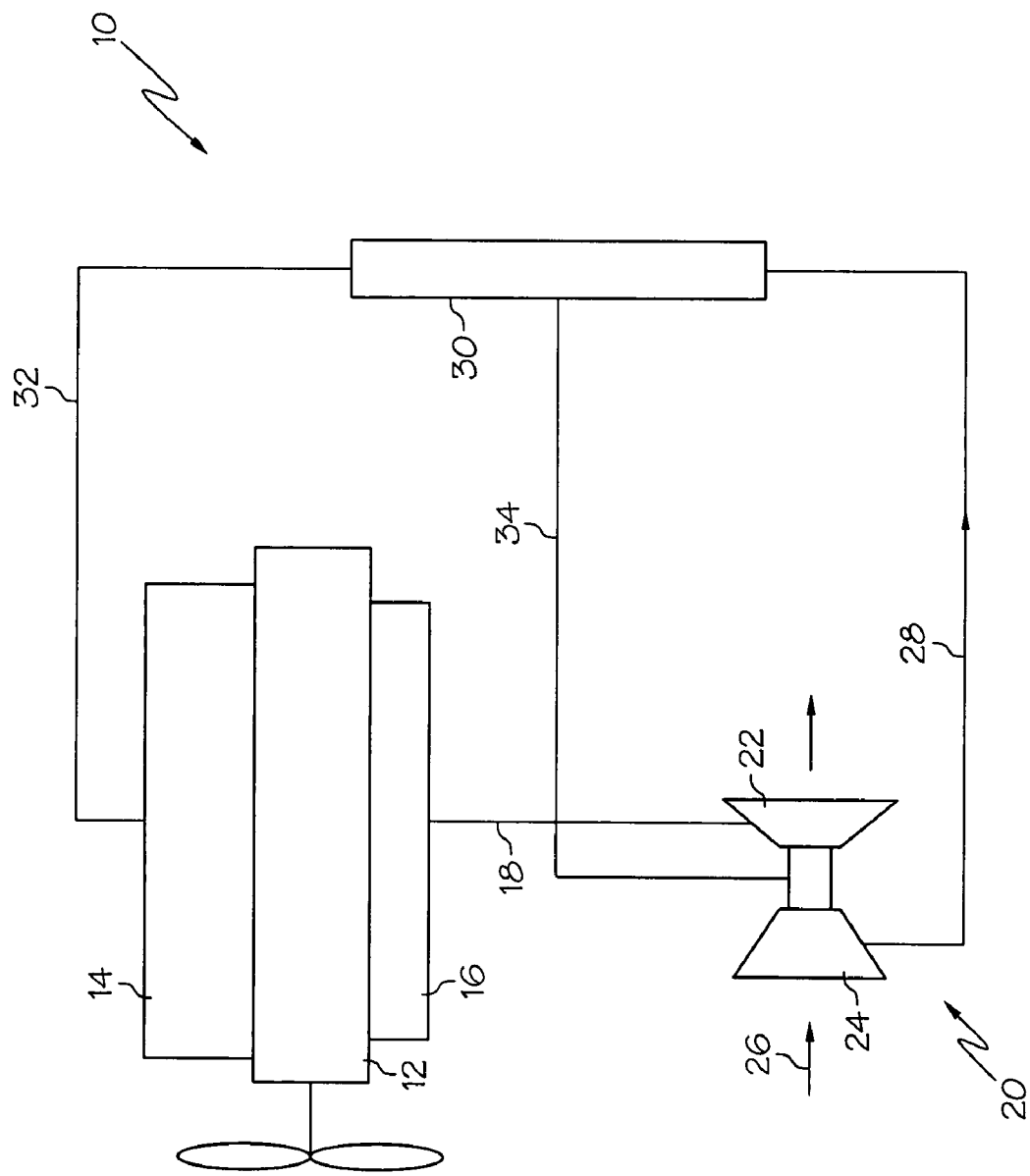
FIG. 1 is a schematic showing an example of a turbocharged engine according to the present invention.

Illustrated in FIG. 1 is a schematic of a turbocharged engine 10. Turbocharged engine 10 may comprise an engine 12, an intake manifold 14 and an exhaust manifold 16. Air may enter the engine through intake manifold 14 and may be mixed with fuel and combusted in engine 12. The resulting engine exhaust gas 18 may then exit through exhaust manifold 16 to a turbocharger 20. Turbocharger 20 may comprise a turbine 22, wherein the turbine may be powered by engine exhaust gas 18, and a boost compressor 24, which may be driven by turbine 22. When operating, intake air 26 may enter boost compressor 24 and a resulting compressed air stream 28 may exit the compressor. Compressed air stream 28 may then pass through an air charge cooler 30, where it is cooled before being directed back to engine 12 as engine compressed air stream 32. After passing through air charge cooler 30, a portion of the cooled compressed air may be diverted as air bearing cooling air 34. Air bearing cooling air 34 may flow back to turbocharger 20 to cool the air bearings (not shown) within turbocharger 20.

Figure 2:
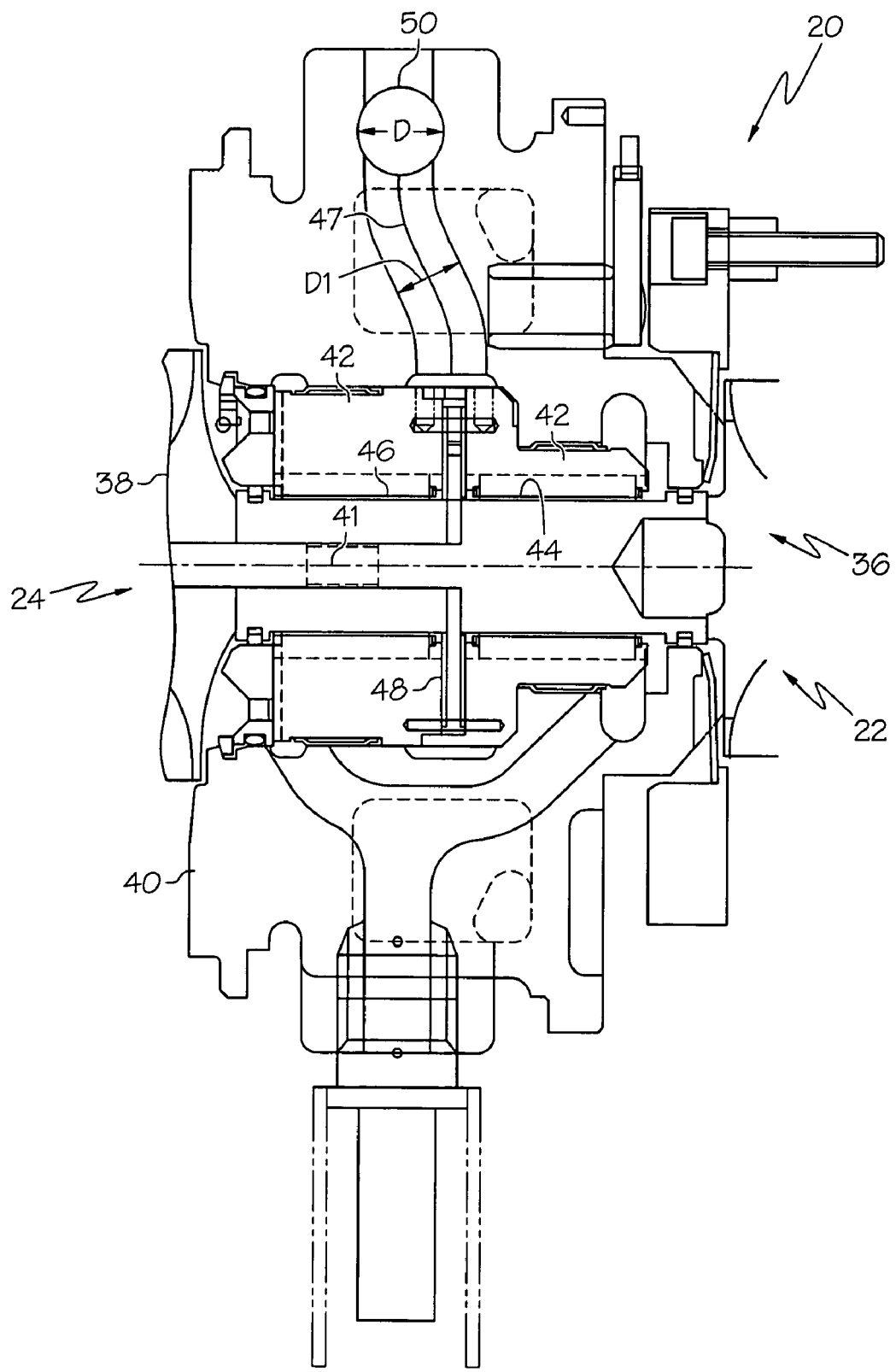
FIG. 2 is a cross-sectional view of a turbocharger according to the present invention.

FIG. 2 shows turbocharger 20 in greater detail. Turbocharger 20 may comprise a turbine wheel 36 as part of turbine 22 and a boost compressor wheel 38 as part of boost compressor 24. Turbine 22 and boost compressor 24 may be connected by a shaft 41. Turbocharger 20 may further comprise a bearing housing 40 with stationary bearing carriers 42. Stationary bearing carriers 42 may hold the air bearings 44, 46 and 48, represented here as first journal bearing 44, second journal bearing 46 and thrust bearing 48. Bearing housing 40 may also comprise cooling air flow regulating device 50. Cooling air flow regulating device 50 may be placed in cooling air flow 47, wherein cooling air flow is the path of the cooling air to the air bearings 44, 46 and 48. Cooling air flow regulating device 50 may entirely block the cooling air flow 47 when closed, or optionally, as discussed below, may allow a small amount of cooling air flow 47 to pass therethrough even when the cooling air flow regulating device 50 is closed. In one embodiment of the present invention, the cooling air flow regulating device 50 may have a diameter, D, that is greater than a diameter D1 of the cooling air flow 47.

Figure 3:
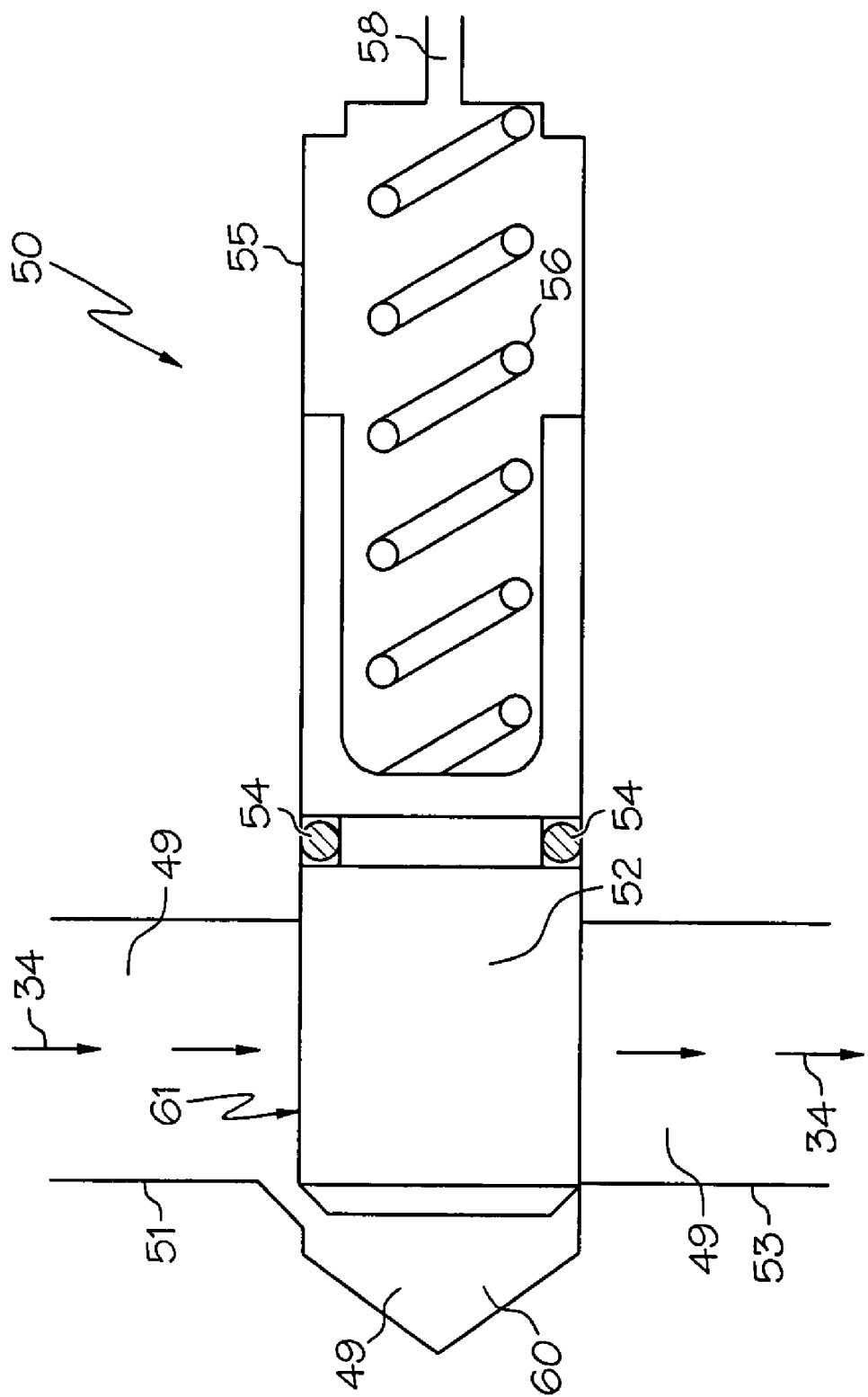
FIG. 3 is a cross-sectional view of a cooling air flow regulating device according to one embodiment of the present invention.
Figure 4:
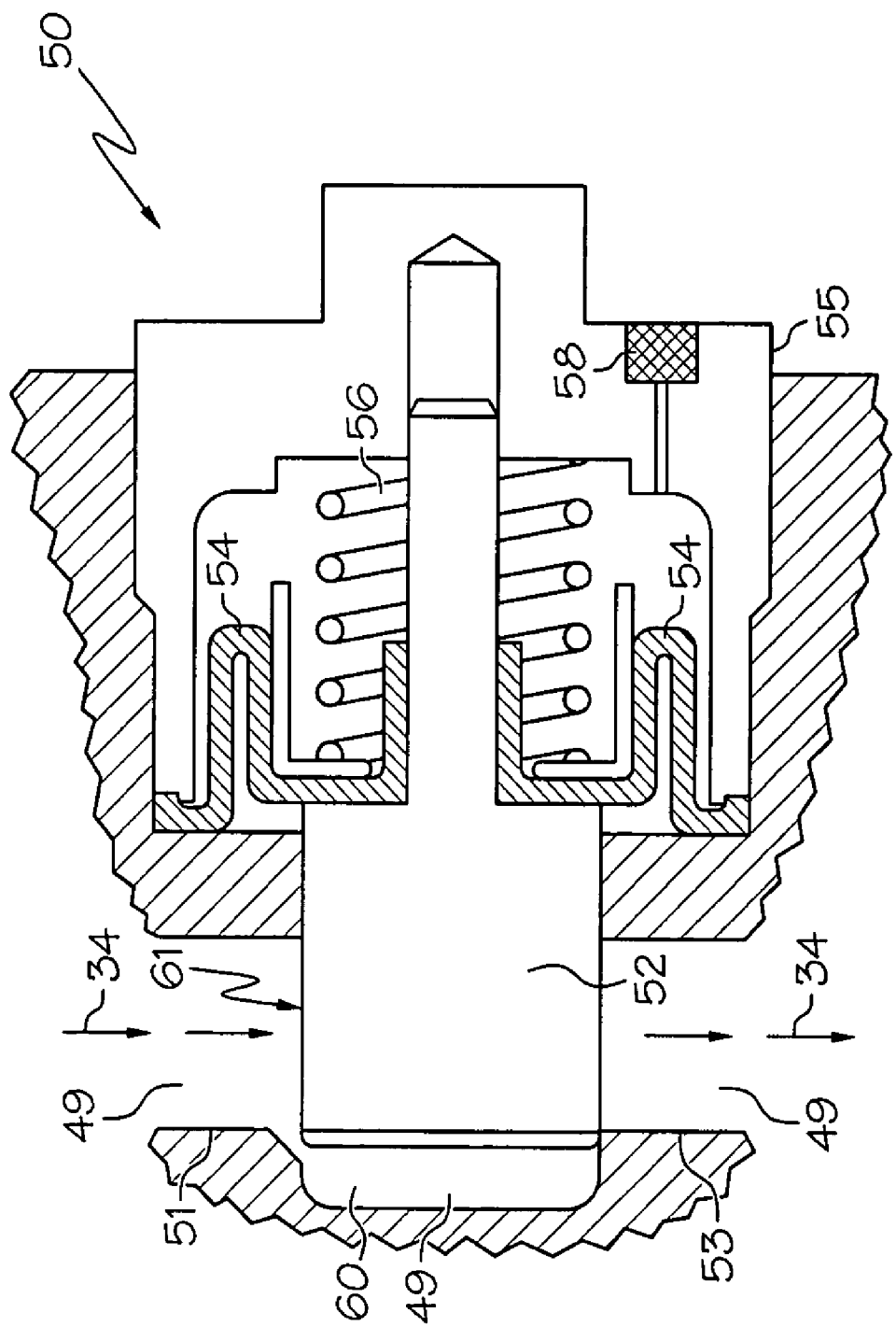
FIG. 4 is a cross-sectional view of a cooling air flow regulating device according to another embodiment of the present invention.

Cooling air flow regulating device 50 is shown in greater detail in FIGS. 3 and 4. Cooling air flow regulating device 50 may comprise a housing 55 where housing 55 may comprise a vent 58, a cooling air inlet 51 and a cooling air outlet 53. Cooling air inlet 51 and outlet 53 may be situated such that they form a cooling air passage 49. Cooling air flow regulating device 50 may also comprise a piston 52 disposed within housing 55 such that piston 52 may be movable between a first position blocking cooling air passage 49 and a second position outside of cooling air passage 49. A side portion 61 of the piston 52 may block the flow of cooling air through the cooling air passage 49 when the piston 52 is in the first position. Piston 52 may be disposed within housing 55 between cooling air passage 49 and vent 58. Housing 55 and piston 52 may be any shape desired where piston 52 may move along housing 55. Piston 52 may be held in place by an actuating device where the actuating device may be responsive to an air pressure in a receiving cavity 60. The air pressure in receiving cavity 60 may correspond to the air pressure in cooling air passage 49 upstream of cooling air flow regulating device 50. The actuating device is represented in FIG. 3 by a spring 56, however it will be appreciated that the actuating device may be any device that holds piston 52 in a desired position at a certain air pressure in receiving cavity 60 and is capable of moving piston 52 between the first position blocking cooling air passage 49 and the second position outside of cooling air passage 49. The piston 52 may move in an axial direction, orthogonal to a direction of the cooling air flow through the cooling air passage 49 immediately upstream of the piston 52, so that the piston 52 may be moved outside of the cooling air passage by an increased pressure of cooling air 34 in the cooling air passage 49, thereby allowing at least a portion of the cooling air 34 to flow to the air bearing (not shown) both linearly through the cooling air flow regulating device 50 and parallel to the cooling air flow immediately upstream of the piston 52. In other words, when the cooling air flow regulating device 50 is open, the air flow through the device 50 may not be deflected by the device 50 and the air flow may be moved substantially in the same direction as the air upstream of the device 50. For example, in one embodiment, housing 55 may not comprise vent 58 and the actuating device may be air at a desired pressure. In this embodiment, piston 52 may have an air-tight fit in housing 55 such that air from the actuating device does not leak into cooling air passage 49. Spring 56 may be any type of spring that would hold piston 52 in place and allow for movement of piston 52 at a desired pressure of cooling air 34. In an alternate illustrative embodiment, spring 56 may be, but not limited to, a coil, leaf or bevel spring. It is also contemplated that other actuating devices that may serve the same purpose as spring 56 may also be used with the present invention.

Cooling air flow regulating device 50 may further comprise a seal 54 circumferentially disposed around piston 52, wherein seal 54 may create a seal between cooling air passage 49 and vent 58. Seal 54 may be any shape or material that seals cooling air passage 49 from vent 58. In one illustrative embodiment, as shown in FIG. 3, seal 54 may be, but not limited to, an o-ring. In an alternate illustrative embodiment, as shown in FIG. 4, seal 54 may be a diaphragm. Moreover, seal 54 may comprise any appropriate material, such as, but not limited to, high temperature reinforced rubber or silicone.

As illustrated in FIG. 3, when cooling air flow regulating device 50 is in the shutoff position, piston 52 may block cooling air passage 49. It is contemplated that piston 52 may completely block cooling air passage 49 or it may allow a small amount of flow of cooling air, where the small amount is not sufficient to require operation of boost compressor 30. In general, when engine 12 is at low speed, cooling air 34 may not have enough pressure to force piston 52 to move away from receiving cavity 60. As engine 12 speed increases, there may be a concomitant increase in the pressure of cooling air 34 and at a desired speed, the pressure of cooling air 34 may be able to force piston 52 to move away from receiving cavity 60, toward vent 58. Vent 58 may provide an outlet for air displaced by the movement of piston 52. At low speeds, cooling of air bearings 44, 46, 48 may not be required. The turbocharger speed 20 at which cooling of air bearing 44, 46, 48 may be required may be determined empirically or by simulation. In one illustrative embodiment, cooling of air bearings 44, 46, 48 may be required when the speed of engine 12 is about at least 40% of maximum operational speed. Therefore, if engine 12 has a maximum operational speed of 100,000 rpm, then air cooling flow regulating device 50 may be put into an open position at 40,000 rpm. The pressure of cooling air 34 may be related to speed by $f(speed)^2$ where pressure is a function of the square of the speed. Cooling air flow regulating device 50 may be set such that piston 52 may be forced out of cooling air passage 49 at the desired engine speed and cooling air pressure by selecting the appropriate size and strength for spring 56.

Figure 5:
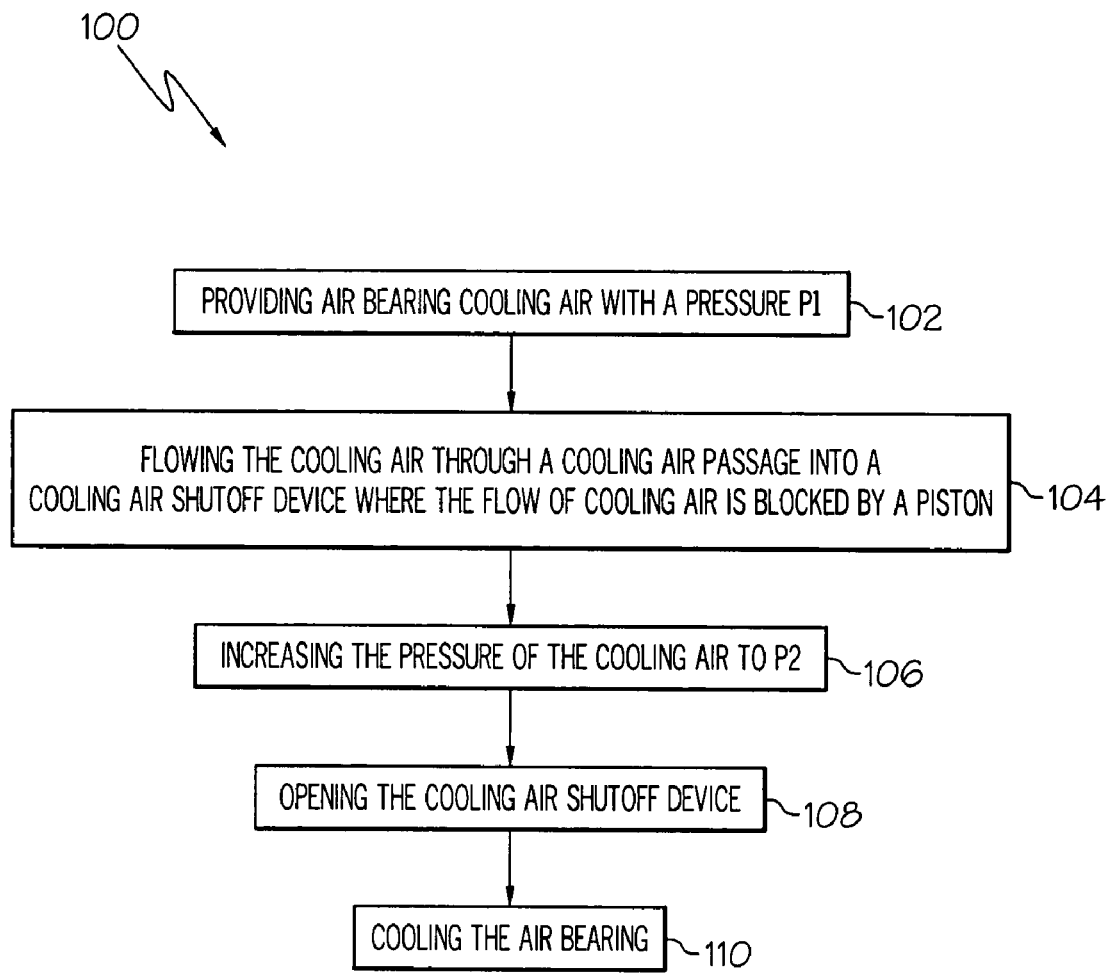
FIG. 5 is a flow-chart illustrating a method of cooling an air bearing according to the present invention.
Figure 6:
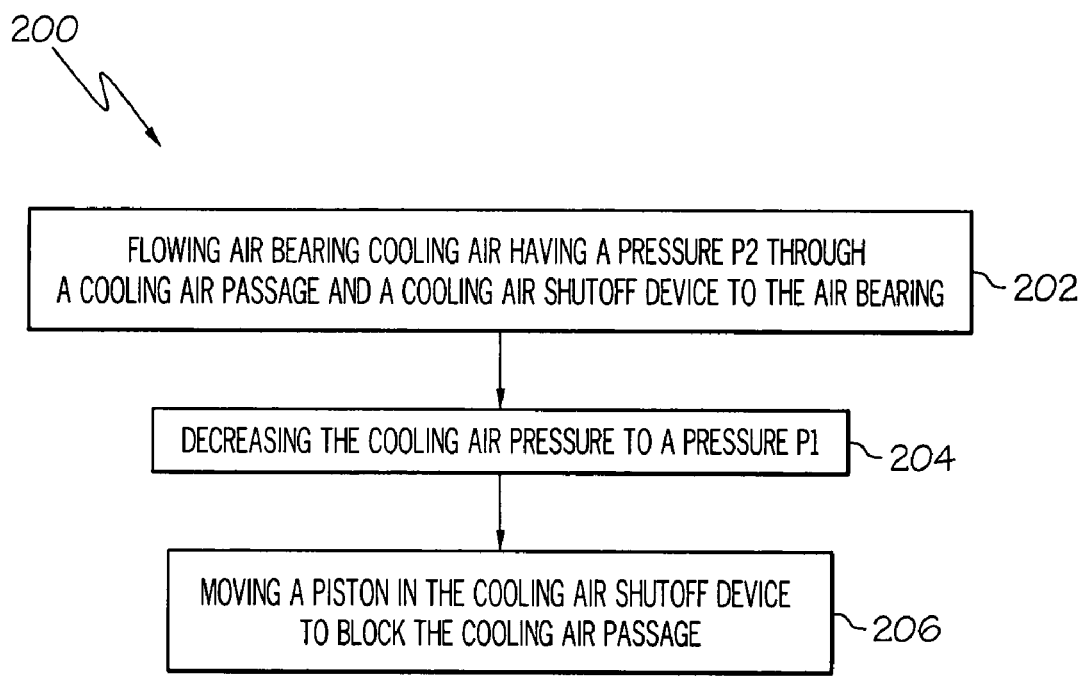
FIG. 6 is a flow-chart illustrating a method of shutting off cooling air to an air bearing according to the present invention.

Also provided is a method of cooling an air bearing using the cooling air flow regulating device of the present invention. Method 100, shown in FIG. 5, may comprise step 102 of providing air bearing cooling air, the bearing cooling air comprising a pressure $P_1$ and step 104 of flowing the cooling air through a cooling air passage into a cooling air flow regulating device, the cooling air flow regulating device comprising a piston and wherein the piston is in a closed position, blocking the flow of cooling air through the cooling air flow regulating device. Method 100 may further comprise step 106 of increasing the pressure of the cooling air to $P_2$ and step 108 of the cooling air forcing the piston to move away from the cooling air passage, allowing the cooling air to flow through the cooling air flow regulating device to the air bearing and finally, step 110 of cooling the air bearing. Conversely, method 200 of FIG. 6, may be a method for shutting off the flow of cooling air to an air bearing comprising step 202 of flowing air bearing cooling air having a pressure $P_2$ through a cooling air passage and a cooling air flow regulating device to the air bearing, the cooling air flow regulating device being disposed in the cooling air passage and wherein the cooling air flow regulating device comprises a piston. The piston is positioned in the air cooling flow regulating device such that it does not block the cooling air passage. Method 200 may also comprise step 204 of decreasing the cooling air pressure to a pressure $P_1$ and step 206 of moving the piston to block the cooling air passage, wherein no cooling air flows through the cooling air flow regulating device.

It should be understood, of course, that the foregoing relates to exemplary embodiments of the invention and that modifications may be made without departing from the spirit and scope of the invention as set forth in the following claims.

I claim:

1. A method of cooling an air bearing comprising the steps of:

providing air bearing cooling air, the air bearing cooling air comprising a pressure $P_1$;

flowing the air bearing cooling air through a cooling air passage as a cooling air flow into a cooling air flow regulating device, the cooling air flow regulating device comprising a piston and wherein the piston is in a closed position, blocking the flow of air bearing cooling air through the cooling air flow regulating device;

increasing the pressure of the air bearing cooling air to $P_2$;

forcing the piston to move in an axial direction, orthogonal to a direction of the cooling air flow immediately upstream of the piston, so that the piston is moved outside of the cooling air passage by the increased pressure $P_2$, thereby allowing at least a portion of the air bearing cooling air to flow to the air bearing both linearly through the cooling air flow regulating device and parallel to the cooling air flow immediately upstream of the piston; and cooling the air bearing.

2. The method of claim 1 wherein the step of cooling the air bearing cools an air bearing of a turbocharger of a turbocharged engine.

3. The method of claim 2 wherein the cooling air pressure is increased by increasing engine speed of the turbocharged engine.

4. The method of claim 3 wherein the engine speed is increased to at least about 40% of maximum operational engine speed to provide pressure $P_2$.

5. A cooling air flow regulating device comprising:
a housing, wherein the housing comprises an air inlet and an air outlet, wherein the air inlet and air outlet form a cooling air passage for holding the cooling air flow having an air pressure therein;
a piston, the piston being disposed in the housing and wherein the piston is movable between a first position where a side portion of the piston is blocking cooling air flow through the cooling air passage and a second position outside of the cooling air passage;
a receiving cavity for receiving a portion of the cooling air flow, the receiving cavity providing the air pressure of the cooling air flow to a bottom portion of the piston;
an actuating device, wherein
the actuating device keeps the piston in the first position when the air pressure in the receiving cavity is insufficient to move the piston to the second position; and
the actuating device allows at least a portion of the cooling air flow to move both linearly through the cooling air passage at the piston and parallel to the cooling air flow immediately upstream of the piston when the air pressure in the cooling air passage is sufficient to move the piston to the second position.

6. The cooling air flow regulating device of claim 5 further comprising a seal, the seal being circumferentially disposed around the piston.

7. The cooling air flow regulating device of claim 6 wherein the seal is an o-ring.

8. The cooling air flow regulating device of claim 6 wherein the seal is a diaphragm.

9. The cooling air flow regulating device of claim 5 wherein the actuating device is a spring.

10. The cooling air flow regulating device of claim 9 wherein the spring is a coil, leaf or bevel spring.

11. The cooling air flow regulating device of claim 5 wherein the air inlet is in fluid communication with an air charge cooler.

12. The cooling air flow regulating device of claim 5 wherein the air outlet is in fluid communication with an air bearing.

13. The cooling air flow regulating device of claim 5 wherein the piston moves between its first and second positions along an axis that is orthogonal to an axis of the cooling air flow immediately upstream of the piston.

14. A cooling air flow regulating device comprising:
a housing, wherein the housing comprises a vent, an air inlet and an air outlet, wherein the air inlet and air outlet form a cooling air passage for holding the cooling air flow having an air pressure therein;
a piston, the piston being disposed between the cooling air passage and the vent;
a seal, the seal disposed between the cooling air passage and the vent;
a spring, the spring being disposed between the piston and the vent in the housing;
wherein the piston has an open position and a closed position responsive to the air pressure of the cooling air flow, wherein the open position allows at least a portion of the cooling air flow to move both linearly through the cooling air passage at the piston and parallel to the cooling air flow immediately upstream of the piston, and wherein the closed position allows a side portion of the piston to block the cooling air flow through the cooling air passage;
wherein the spring holds the piston in the closed position until the air pressure of the cooling air flow reaches a pressure sufficient to move the piston to an open position; and
wherein the piston moves between its respective positions along an axis that is orthogonal to the direction of the cooling air flow immediately upstream of the piston.

15. The cooling air flow regulating device of claim 14 wherein the seal comprises one of an o-ring and a diaphragm.

16. The cooling air flow regulating device of claim 15 wherein the diaphragm comprises high temperature reinforced rubber or silicon.

17. The cooling air flow regulating device of claim 14 wherein the seal comprises high temperature reinforced rubber or silicon.

18. The cooling air flow regulating device of claim 14 wherein the cooling air flow regulating device is part of a turbocharger.

19. The cooling air flow regulating device of claim 14 wherein the air inlet is in fluid communication with an air charge cooler and the air outlet is in fluid communication with an air bearing.

20. The cooling air flow regulating device of claim 14 wherein the cooling air flow regulating device is part of an electric-driven turbocompressor.

* * * * *